3,530,114
ISOLATION PROCEDURES OF COUMERMYCIN $A_1$
Hubert Maehr, Belleville, James Parnell Scannell, Bloomfield, and Vernon Zeitz, Passaic, N.J., assignors to Hoffmann-La Roche Inc., Nutley, N.J., a corporation of New Jersey
No Drawing. Filed Sept. 16, 1969, Ser. No. 858,523
Int. Cl. C07c 47/18
U.S. Cl. 260—210					4 Claims

ABSTRACT OF THE DISCLOSURE

A process for isolating the antibiotic coumermycin $A_1$ from a crude coumermycin complex without the prior isolation of the coumermycin complex involving a two-phase system, one phase comprising an ester of a lower alkanoic acid or a water immiscible lower alkyl ketone and the other phase comprising a water miscible solvent.

RELATED APPLICATION

Related to this application is application Ser. No. 801,168 filed of Feb. 20, 1969 in the names of Maehr, Scannell and Zeitz.

DETAILED DESCRIPTION OF THE INVENTION

As is well known to those skilled in the art, crude beers obtained during production of an antibiotic substance usually contain numerous impurities including unwanted fermentation products in addition to the desired antibiotic substance. It is often expensive, time consuming and difficult, especially in large-scale operations, to isolate the antibiotic substance from such crude beers. Often ion exchange techniques are utilized. However, this technique is sometimes undesirable because constituents of the crude often compete with the desired antibiotic for the resin. Also, the antibiotic substance is frequently adsorbed so strongly on the resin that elution of it is difficult and is seldom complete. If the isolation procedure requires a concentrated beer, large amounts of energy need be expended for the necessary water removal. Furthermore, for large scale operations, it is sometimes inefficient and difficult if the separation of the antibiotic from the beer is not effected in a continuous manner. These difficulties and others are avoided by the use of the novel process of the present invention designed to separate the desired antibiotic substance, coumermycin $A_1$ from dilute aqueous beers in a facile and simple manner avoiding the use of several different types of equipment, extensive material handling and the like.

It has been reported that the crude coumermycin complex contains, in addition to the most important component coumermycin $A_1$, several other substances whose structural configurations are quite similar to the structural configuration of coumermycin $A_1$. These substances have been designated, for example, coumermycin $A_2$, $D_2$ and the like (see Berger et al., Antimicrob. Agents and Chemo, p. 778 (1965)). If cobalt is utilized in the fementation medium during the cultivation of the organism Streptomyces hazeliensis, which organism is known to produce a crude coumermycin complex, the presence of the $A_2$ component in the so-obtained crude is virtually eliminated. However, even though cobalt is utilized the $D_2$ substance is produced in substantial amounts.

This invention seeks to effect the separation of coumermycin $A_1$ in substantially pure form by a novel process which does not require the isolation and purification of the coumermycin complex but achieves the extraction of the antibiotic complex from the mycelium and subsequent separation of coumermycin $A_1$ from the co-produced members of the coumermycin crude with concomitant purification of coumermycin $A_1$ in a continuous fashion. This process does not require different types of equipment, concentration of the fermentation beers, extensive material handling and the other of the difficulties inherent in an antibiotic isolation procedure.

In our prior patent application Ser. No. 801,168, there is described a preparative approach designed to effect the separation of the coumermycin complex per se from the fermentation broth utilizing a water miscible organic solvent in a basic medium. This invention is an improvement on the technique described in this prior case.

In the technique described in Ser. No. 801,168, a crude coumermycin complex is isolated from the water miscible solvent-containing medium in which it is present by acidifying the said medium to a pH of 2–5 with a dilute mineral acid. The organic solvent present may be partially removed before or after the pH adjustment by evaporation under reduced pressure. The complex which contains the major component coumermycin $A_1$ is then treated to effect the separation of coumermycin $A_1$ from the various members of the crude complex by, for example, a liquid-liquid multistage extraction technique. With the present invention, it has been discovered that by the simple and facile treatment of the medium comprising the coumermycin complex and the water miscible solvent with a lower alkyl ester of a lower alkanoic acid, or a water immiscible lower alkyl ketone, there can be obtained a two-phase system containing coumermycin $A_1$ in one phase to the virtual exclusion of the other members of the coumermycin crude and other impurities.

More particularly, in achieving the purposes of the present invention, the separation of the cells from the fermentation beer is first effected. This end is accomplished by first adjusting the pH of the fermentation beer to from about 2 to about 5, preferably to pH 4, and then separating the cells by filtration. The pH adjustment of the fermentation broth is done with any conveniently available dilute mineral acid, such as sulfuric acid. Maintaining the pH in this range as described in the said prior case during the cell separation step serves a duel purpose. First, it avoids diffusion of the crude complex from the cells and, secondly, it causes that portion of the complex which has diffused from the cells during the fermentation procedure to precipitate and hence, to deposit itself upon the surface of the cells. Thus, substantially all of the complex formed during the fermentation procedure is removed during the cell separation step.

After their separation from the fermentation medium, the cells are treated with an aqueous solution of a water miscible organic solvent at from about a very nearly neutral pH to about a slightly basic pH, whereby the complex is extracted from the cells. The water in the aqueous solution insures a more efficient extraction of the complex from impurities in the broth or associated with the cells and, hence, simplifies subsequent procedures designed to segregate the various members of the complex.

When extracting the complex from the cells with a water miscible solvent, the pH of the medium should be in the range of from about pH 7 to about pH 9, most preferably from about pH 7.3 to about pH 7.8. The adjustment of the pH is preferably effected with any suitable organic or inorganic base, preferably, an inorganic base such as an alkali metal hydroxide (e.g. sodium hydroxide or ammonium hydroxide and the like.

The organic solvents which can be utilized to extract the complex are those which are essentially miscible with water. Representative of these are polar solvents such as water miscible lower alkanols containing 1–7, preferably 1–4 carbon atoms, e.g., methanol, ethanol, normal or isopropanol, tertiary butyl alcohol and the like, simple ketones such as acetone, water miscible ethers such as tetrahydrofuran, dioxane and the like, glycols such as ethylene glycol dimethyl ether, propyleneglycol dimethyl ether and the like, dimethyl sulfoxide, dimethylformamide, dimethylacetamide and other water miscible solvents. Usable for the purposes of the present invention are mixtures of the solvents with each other. Preferred are the alkanols, particularly, methanol and ethanol.

The amount of water present in the extracting solvent system can vary from about 25 to 70 parts by volume per 100 parts of the solvent system. If ethanol is utilized as the water miscible organic solvent, it has been observed that by volume from about 25 parts to about 50 parts of water and from about 75 parts to about 50 parts of ethanol are most suitable. It should be noted that the greater the polarity of the water miscible solvent, the higher its concentration in the aqueous extraction solvent system should be. This aspect of the process described herein above is not part of the present invention but it is disclosed herein in order that the instant disclosure may be complete.

The novel process feature of the present invention involves the separation of coumermycin $A_1$ from the medium containing crude coumermycin complex and the water miscible solvent as obtained above. To effect the novel process step which is at the heart of the present invention, there is added to the medium containing the water miscible solvent and the crude coumermycin complex as obtained above, a member selected from the group consisting of lower alkyl esters of lower alkanoic acids and a water immiscible lower alkyl ketone. Preferred among this class of reagents are methylacetate, ethylacetate, ethyl propionate, ethyl butyrate, methyl isobutyl ketone, ethyl isobutyl ketone and the like. The resulting medium is equilibrated with agitation. By proceeding accordingly, there results a two-phase system. The upper phase, formed by the addition of the lower alkyl esters of lower alkanoic acids or a water miscible ketone contains preferentially coumermycin $A_1$ as the monosodium salt, whereas the other members of the complex are concentrated in the lower, aqueous phase. In order to ensure optimum yields of coumermycin $A_1$, the lower, aqueous phase can be extracted twice more after phase separation and the combined upper phases washed with dilute mineral acid, such as 0.05 N hydrochloric acid, or an aqueous buffer solution with a pH below 4.5, to convert the coumermycin $A_1$ monosodium salt to the free acid form. Coumermycin $A_1$ in the free acid form can subsequently be isolated from the upper organic phase by conventional techniques.

Thus, the invention relates to a process for separating coumermycin $A_1$ from a crude coumermycin complex which comprises separating the cells from a coumermycin fermentation beer, treating said cells after separation with an aqueous solvent system containing a water miscible organic solvent and having a pH of from about 7 to about 9, filtering the so-obtained media to remove the spent cells, the improvement residing in equilibrating the so-obtained filtrate with a member selected from the group consisting of a lower alkyl ester of a lower alkanoic acid and a water immiscible lower alkyl ketone whereby a two-phase system is obtained, separating the two phases and recovering from the phase containing a member selected from the group consisting of a lower alkyl ester of a lower alkanoic acid or a lower alkyl ketone, coumermycin $A_1$ in substantially pure free acid form.

By the term "lower alkyl," as found herein, there is intended both straight and branched chain hydrocarbon radicals containing 1 to 7, most preferably 1 to 4 carbon atoms, such as methyl, ethyl, propyl, butyl and the like. The term "lower alkanoic acids" connote fatty acids containing from 2 to 7 hydrocarbon atoms, such as acetic acid, propionic acid, butyric acid and the like.

The following example is illustrative but not limitative of the present invention. All temperatures are stated in degrees centigrade.

EXAMPLE

The pH of 4 liters of a coumermycin fermentation broth prepared utilizing cobalt in the fermentation medium as described in the prior art is adjusted to 4 with 6 N sulfuric acid. The broth is mixed with approximately 40 g. of diatomaceous earth (Celite 535) followed by filtration. The resulting 0.5 kg. of filter cake is homogenized with 300 ml. of ethanol, 275 ml. water and approximately 25 ml. of 1 N sodium hydroxide solution to adjust the pH to 7.5. The suspension is filtered after a one hour stirring period and the filter cake is washed with 60 ml. of aqueous ethanol (1:1, v./v.). Filtrate and wash are combined and added to 500 ml. of ethyl acetate. The resulting solution is equilibrated by stirring, the upper phase is withdrawn and the lower phase is extracted twice more with 200 ml. portions each of ethyl acetate. All upper phases are combined, washed once with 100 ml. of 0.05 N hydrochloric acid and then three times with 150 ml. portions each of water. The resulting upper phase is concentrated to a small volume and most of the remaining water is removed by codistillation with 1-propanol. Precipitated material is redissolved with 20 ml. ethyl acetate, and coumermycin $A_1$ is precipitated by addition of 200 ml. Skelly Solve B.[1] The wet solids are washed with methanol until the washings are essentially colorless. The remaining solids are dried under reduced pressure to yield coumermycin $A_1$ in the free acid form.

One gram of this material is suspended in 4 ml. of acetone, the suspension is cooled to 5° and the calculated amount of 4 N sodium hydroxide solution (approximately 0.22 ml.) is added dropwise to the stirred suspension. Toward the end of the alkali addition, all coumermycin $A_1$ has dissolved. Stirring is continued for about 10 minutes and the coumermycin $A_1$ monosodium salt solution is filtered. To the filtrate are added 4 ml. of acetone and after refrigeration overnight, the crystalline monosodium $A_1$ salt is recovered by filtration. The product is washed with 1 ml. of acetone and 2 ml. of petroleum ether (30–60°) and dried under reduced pressure.

What is claimed is:

1. A process for isolating coumermycin $A_1$ from a crude coumermycin complex which comprises separating a coumermycin complex from the cells present in a coumermycin fermentation broth, treating said cells with an aqueous solvent system containing a water miscible organic solvent and having a pH of from about 7 to about 9, filtering the so-obtained media to remove the spent cells, the improvement residing in equilibrating the so-obtained filtrate with a member selected from the group consisting of a lower alkyl ester of a lower alkanoic acid and a water immiscible lower alkyl ketone, whereby a two-phase system is obtained, separating the two phases and recovering from the phase containing the member selected from the group consisting of a lower alkyl ester of a lower alkanoic acid and a water immiscible lower alkyl ketone, coumermycin $A_1$ in substantially pure free acid form.

2. A process as in claim 1 where the member utilized is a lower alkyl ester of a lower alkanoic acid.

3. A process as in claim 2 wherein the lower alkyl ester of the alkanoic acid utilized is a lower alkyl acetate.

4. A process as in claim 3 wherein the lower alkyl acetate is ethyl acetate.

[1] Ligroin.

References Cited

UNITED STATES PATENTS 3,155,647  11/1964  Dutcher et al.
3,201,386   8/1965  Kawaguchi et al. ____ 260—210

ELBERT L. ROBERTS, Primary Examiner

J. R. BROWN, Assistant Examiner